United States Patent [19]

Qureshi et al.

[11] Patent Number: 5,193,204
[45] Date of Patent: Mar. 9, 1993

[54] PROCESSOR INTERFACE CIRCUITRY FOR EFFECTING DATA TRANSFERS BETWEEN PROCESSORS

[75] Inventors: Shahid U. H. Qureshi, Natick, Mass.; George P. Chamberlin, Scottsdale, Ariz.

[73] Assignee: Codex Corporation, Mansfield, Mass.

[21] Appl. No.: 478,068

[22] Filed: Feb. 7, 1990

Related U.S. Application Data

[63] Continuation of Ser. No. 147,109, Jan. 21, 1988, abandoned, which is a continuation of Ser. No. 586,681, Mar. 6, 1984, abandoned.

[51] Int. Cl.$^5$ .............................................. G06F 13/12
[52] U.S. Cl. ..................................... 395/800; 395/275; 364/DIG. 2; 364/926; 364/929; 364/931.44; 364/931.49; 364/942.4; 364/942.8; 364/960.2; 364/960.6; 364/965.4
[58] Field of Search ............... 364/200, 900, DIG. 1, 364/DIG. 2; 395/800, 275

[56] References Cited

U.S. PATENT DOCUMENTS

| | | |
|---|---|---|
| 3,678,467 | 7/1972 | Nussbaum et al. |
| 4,149,244 | 4/1979 | Anderson et al. |
| 4,270,167 | 5/1981 | Koehler et al. ............ 364/200 |
| 4,344,176 | 8/1982 | Qureshi ...................... 375/15 |
| 4,355,354 | 10/1982 | Kempf et al. |
| 4,368,514 | 1/1983 | Persaud et al. ............. 364/200 |
| 4,428,044 | 1/1984 | Liron .......................... 364/200 |
| 4,455,661 | 6/1984 | Qureshi ...................... 375/8 |
| 4,509,116 | 4/1985 | Lackey et al. .............. 364/200 |
| 4,547,849 | 10/1985 | Louie et al. ................ 364/200 |
| 4,556,958 | 12/1985 | Ugon .......................... 364/200 |
| 4,731,736 | 3/1988 | Mothersole et al. ........ 364/900 |

FOREIGN PATENT DOCUMENTS 0044033 7/1981 European Pat. Off.
0068994 6/1982 European Pat. Off.

OTHER PUBLICATIONS

Motorola Microprocessors, 8-Bit Microprocessor and Peripheral Data, 1983, Motorola Inc., pp. 3-149 to 3-178.
Nyman et al., "Data Modem Evolution", *Electrical Communication*, vol. 57, No. 3, (1982), pp. 187-194.
Zarrella, "Microprocessor Software Engineering Concept Series", *System Architecture*, 1980, p. 150.

*Primary Examiner*—David L. Clark
*Assistant Examiner*—Matthew C. Fagan
*Attorney, Agent, or Firm*—Darleen J. Stockley

[57] ABSTRACT

Apparatus for enabling a first processor to cause a second processor to effect a transfer of data between the processors in accordance with data transfer commands sent from the first processor to the second processor is described. The processors each have a program instruction memory for enabling the processors to operate independently and simultaneously when no data transfer is occurring between them, and the apparatus includes data transfer circuitry connected between the processors for enabling the data to be transferred, a program instruction decoder associated with the second processor for normally decoding and executing instructions stored in the program instruction memory of the second processor when no data transfer is occurring, and routing circuitry for carrying the data transfer commands from the first processor to the program instruction decoder for decoding to provide signals to the data transfer circuitry to effect a transfer of data.

4 Claims, 3 Drawing Sheets

PROCESSOR INTERFACE CIRCUITRY FOR EFFECTING DATA TRANSFERS BETWEEN PROCESSORS

This is a continuation of copending application Ser. No. 07/147,109 filed on Jan. 21, 1988, now abandoned, which is a continuation of Ser. No. 06/586,681, filed Mar. 6, 1984, now abandoned.

BACKGROUND OF THE INVENTION

This invention relates to controlling transfers of data between two processors, for example, a programmable general-purpose (host) processor and a programmable signal processor cooperating to perform the functions of a modem.

In such modems, signal processing e.g., filtering, modulation, and demodulation, are assigned to the signal processor which is designed to perform those tasks quickly and efficiently. The host processor maintains overall control, supervises the signal processor, and handles interactions with the operator and with the devices which supply and use the information carried over the channel to which the modem is connected. In performing these tasks, data must frequently be transferred back and forth between the data buses of the respective processors.

One way of controlling the data transfer is to connect a pair of registers between the data buses, one register for each direction of data transfer. To complete a data transfer, the processor supplying the data loads it into the proper register and interrupts the other processor (using a special interrupt signal). The other processor then jumps from the instruction it is currently executing to a routine of instructions each of which must be fetched, decoded, and executed in order for the interrupted processor to collect the data from the proper register and acknowledge receipt of the data so that another piece of information may be transferred. Ultimately the interrupted processor jumps back to the instruction which was pending at the time of the interruption. Thus, the processors must execute several instructions in order to complete a single data transfer.

By replacing each register with a first-in first-out (FIFO) buffer memory several pieces of data can be queued up in each direction thus eliminating the need for an interrupt (or other handshake) for each data transfer.

By using a dual-port read-write memory in place of the FIFO buffer, multiple queues can be established in each of the two directions by allocating segments of the memory for use as circular FIFO buffers, thus enhancing flexibility. Input and output pointers and FIFO depth counters must be maintained by each processor to control the memory, at a substantial cost in processor time.

In other systems two or more processors share both program and data memories. In some cases one of the processors is a specialized co-processor used in parallel with a general-purpose microprocessor. The co-processor executes only a certain class of instructions, e.g., floating-point arithmetic, thus relieving the general-purpose microprocessor's load and enhancing its performance. Simultaneous parallel operation of the two processors in such a system requires queueing the instructions to, and the results from, the specialized processor.

SUMMARY OF THE INVENTION

In general, the invention features, in one aspect, apparatus for enabling a first processor to cause a second processor to effect a transfer of data between the processors in accordance with data transfer commands sent from the first processor to the second processor, the processors each having a program instruction memory for enabling the processors to operate independently and simultaneously when no data transfer is occurring between them, the apparatus comprising data transfer circuitry connected between the processors for enabling the data to be transferred, a program instruction decoder associated with the second processor for normally decoding and executing instructions stored in the program instruction memory of the second processor when no data transfer is occurring, and routing circuitry for carrying the data transfer commands from the first processor to the program instruction decoder for decoding and executing to provide signals to the data transfer circuitry to effect a transfer of data.

In preferred embodiments, the first processor also has an address bus for normally carrying addresses representing locations of instructions in the program instruction memory of the first processor, and the routing circuitry comprises at least a portion of the address bus; data transferred from the first processor to the second processor specifies a task to be performed by the second processor by executing a set of corresponding instructions stored in the program instruction memory of the second processor; there is circuitry for accepting from an information-carrying channel and delivering to the channel a carrier modulated in accordance with a sequence of signal points; the transferred data comprises information about the signal points sent and signals received over said channel; the second processor is arranged to perform signal processing tasks on the received signals; and the apparatus includes a memory in the second processor for storing at successive addresses a number (M) of related pieces of the data upon which an operation is to be performed, an indirect address register in the second processor for holding a value corresponding to the address of the next one of the related pieces of information on which the operation is to be performed, and updating circuitry for incrementing the value once after each performance of the operation until incrementing has occurred M-1 times, and thereafter returning the value to its original level.

The invention provides a simple, efficient, flexible, easy to implement technique for controlling data transfers between two processors which at other times can operate simultaneously in parallel; the first processor can simply and quickly perform diagnostics, synchronization, debugging, and monitoring of the second processor; the first processor can control the task sequence of the second processor by sending task commands in the form of data to the second processor; and the modulo M updating circuitry enables signal processing functions to be implemented efficiently.

Other features and advantages of the invention will be apparent from the following description of the preferred embodiment, and from the claims.

DESCRIPTION OF THE PREFERRED EMBODIMENT

Structure

Figure 1:
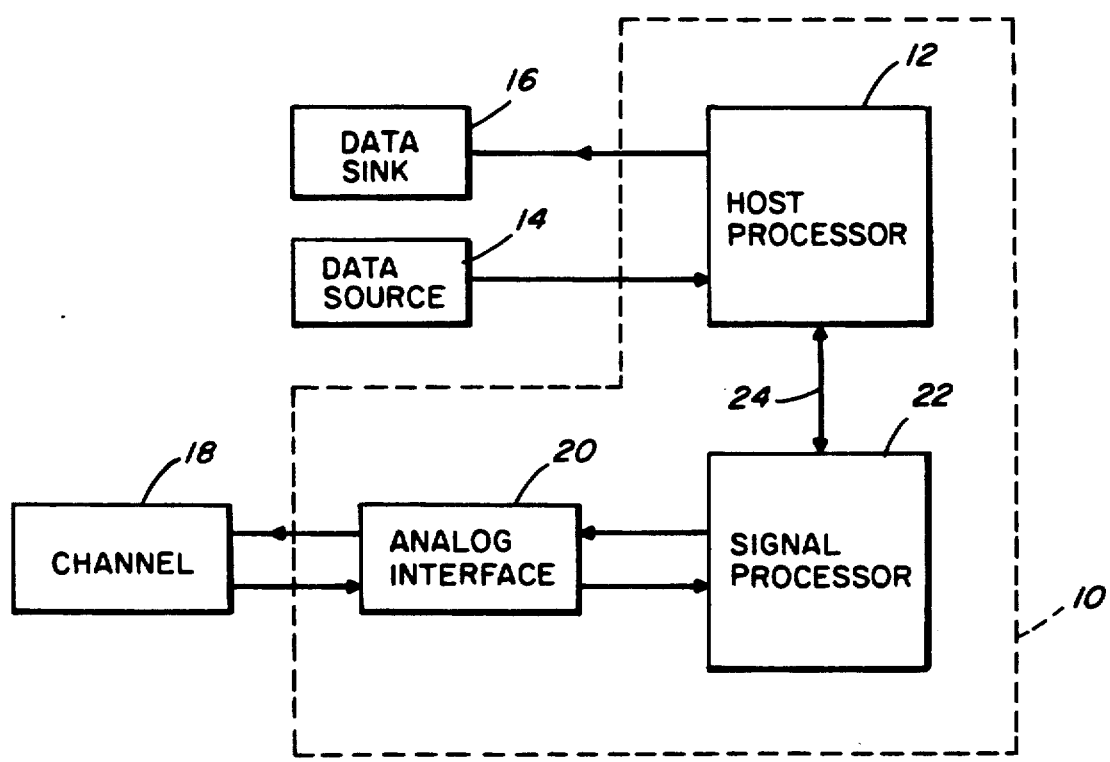
FIG. 1 is a block diagram of a modem system.

Referring to FIG. 1, modem 10 includes a host processor 12 connected to data source 14 (a device having digital data to be transmitted), and to data sink 16 (a device for using received digital data). Channel 18 (for carrying analog modulated carrier signals transmitted by and to modem 10) is connected via analog interface 20 to signal processor element (SPE) 22, which is in turn connected to host processor 12 via connection 24.

Figure 2:
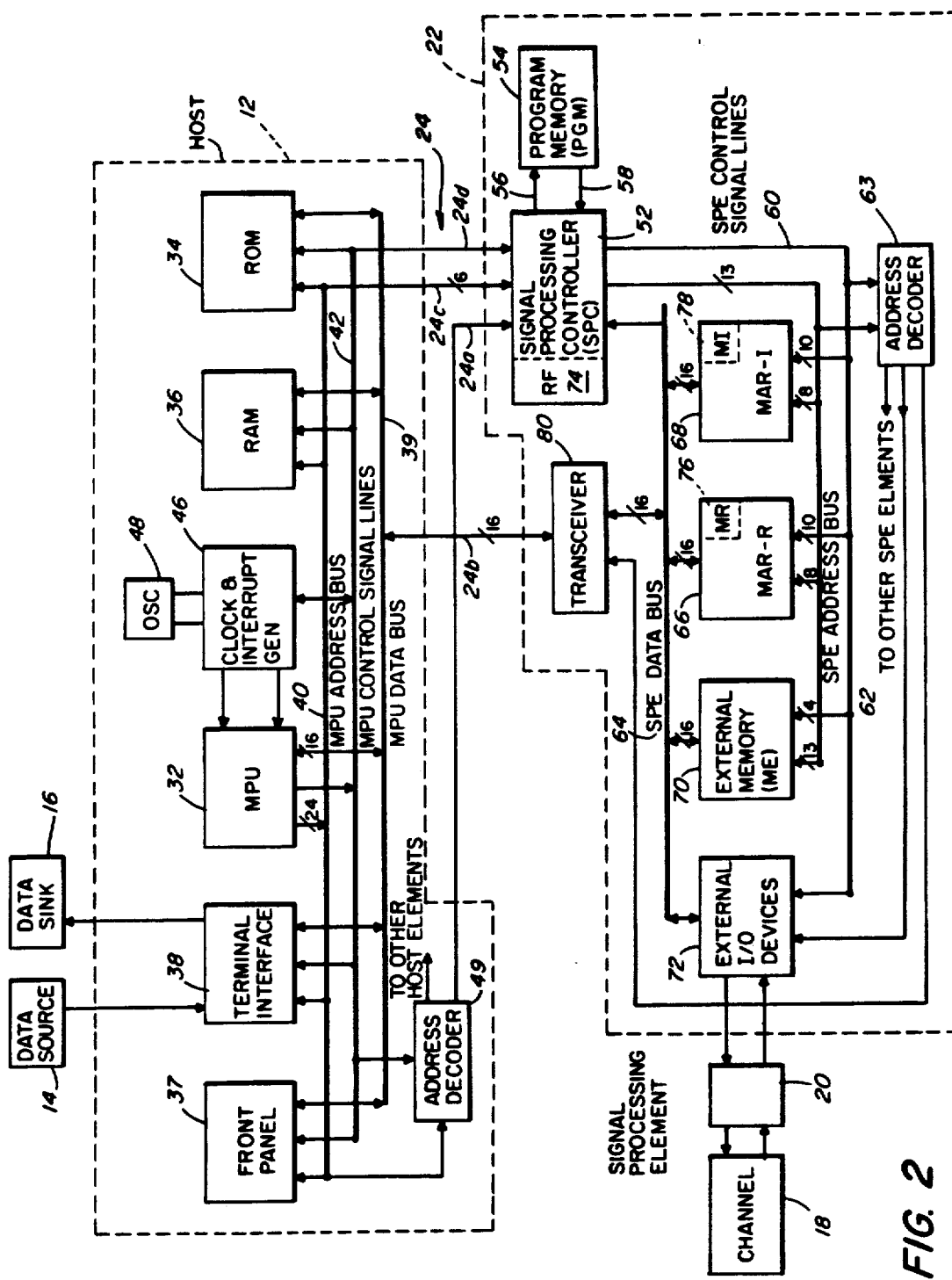
FIG. 2 is a block diagram of the host and signal processors of FIG. 1.

Referring to FIG. 2, in host processor 12 a general-purpose microprocessor unit (MPU) 32 (a Motorola MC68000) is interconnected with read-only memory (ROM) 34, which serves as a program instruction memory, random-access memory (RAM) 36, front panel 37, and terminal interface 38 via MPU data bus 39, MPU address bus 40, and MPU control signal lines 42. Clock and interrupt generator 46, driven by oscillator 48, is connected to MPU 32, to lines 42, and to other elements (by connections not shown). MPU address decoder 49 is connected to MPU address bus 40 and control signal lines 42 and via line 24a to signal processor 22. Connection 24 between processors 12, 22 also includes a 16-bit line 24b from MPU data bus 39 (for carrying data to be transferred), a 6-bit line 24c from the six least significant bit lines of MPU address bus 40 (for carrying data transfer commands), and other control signal lines 24d (described below).

In signal processor 22, lines 24a, 24c, 24d connect to signal processing controller (SPC) 52, which controls the operation of processor 22 by fetching and executing program instructions in 8K × 16 program (instruction) memory 54 (of which only 2K × 16 is actually used in the preferred embodiment). Controller 52 is a large-scale H-MOS integrated circuit that serves as a program sequencer and instruction decoder. Controller 52 and memory 54 are interconnected by 13-bit program address bus 56 (which can be tri-stated to allow another processor to access program memory 54) and 16-bit instruction bus 58. Controller 52 is connected via a number of control signal lines 60, a 13-bit SPE address bus 62, and a 16-bit SPE data bus 64 to two multiplier-accumulator-RAM (MAR) circuits 66, 68 (designated MAR-R and MAR-I, respectively), and to 8K × 16 external memory (ME) 70 (organized to include 2K × 16 RAM and 4K × 16 ROM) and other external I/O devices 72 (including analog-to-digital and digital-to-analog converters, and automatic gain control circuits) and in turn to analog interface 20 (which includes a line interface and transmit and receive filters) MAR-R 66 includes 256 16-bit words of internal memory (MR) 76, a 40-bit accumulator, special registers, and dedicated logic. MAR-I 68 similarly includes 256 × 16-bit words of internal memory (MI) 78 and the same set of other components. Controller 52 is connected via SPE control signal lines 60 and address bus 62 to SPE address decoder 63.

Address decoder 63 is connected to transceiver 80 (a 16-bit tristate, bidirectional bus buffer or interface addressable as an external device) which is in turn connected both to MPU data bus 39 by line 24b and to SPE data bus 64. Transceiver 80 has data transfer circuitry which includes two octal bus transceiver devices, for example type 74LS623, each connecting eight bits of each of the two 16-bit data buses. The transceiver devices allow data transmission from bus 39 to bus 64 depending on two enable inputs 65, 67. When both inputs are inactive, the buses are effectively isolated from each other. Transceiver 80 may be enabled by controller 52 via SPE address decoder 63 to effect a data transfer between the two processors 12, 22 in either direction.

Figure 3:
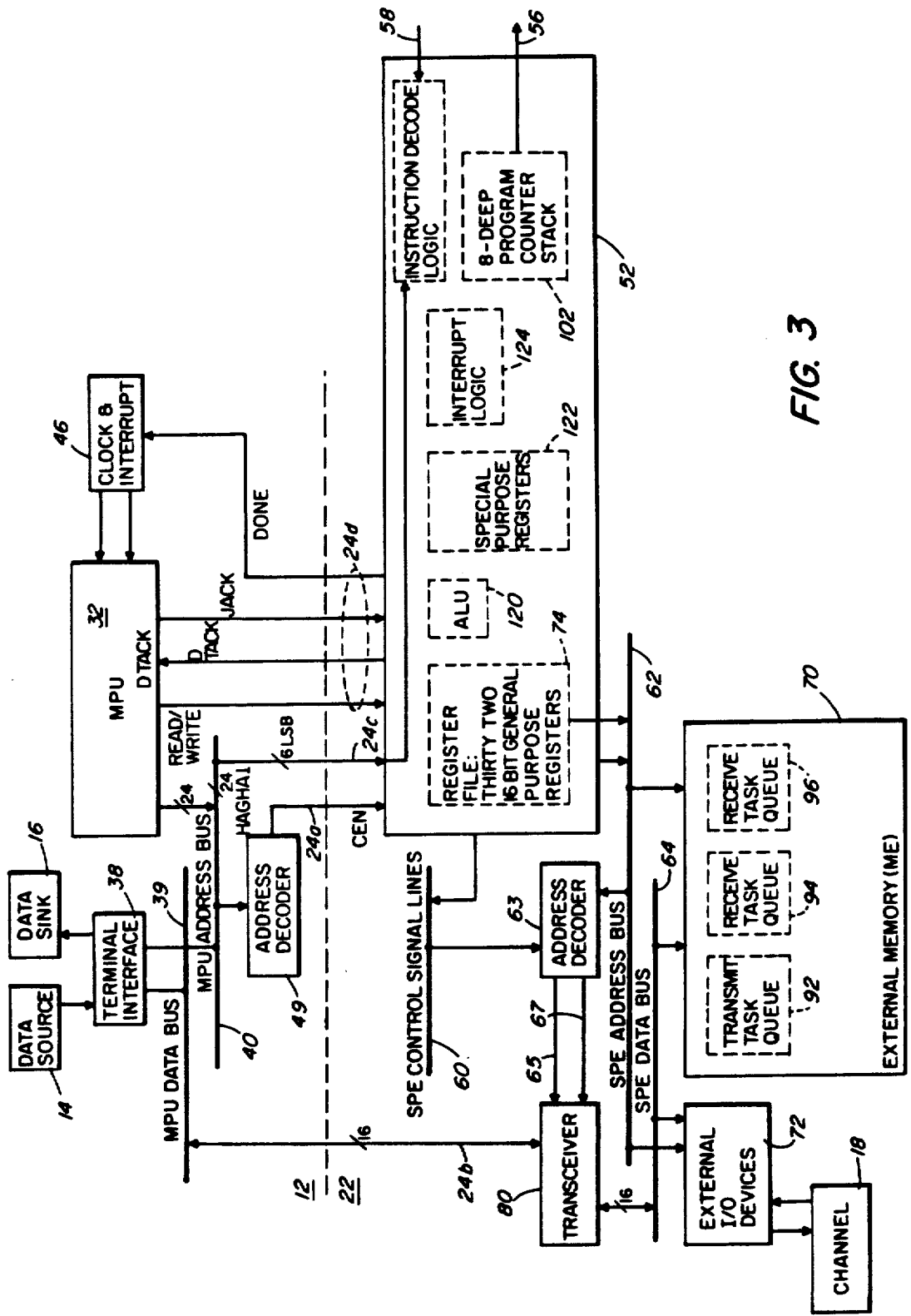
FIG. 3 is a block diagram of the interconnection of the host and signal processors of FIG. 1.

Referring to FIG. 3, the connections between MPU 32 and controller 52 are arranged to enable MPU 32 to cause controller 52 to effect transfers of data between processor 12 and controller 52 through transceiver 80. Connections 24a, 24c, and 24d carry the data transfer commands and control signals from processor 12. The data transferred through transceiver 80 can be information about signals received or signal points to be sent over channel 18, information about the operating status of the processors, or signal processing instructions telling the signal processor 22 what task to perform.

Line 24a carries a chip enable (CEN) signal to controller 52 by which the MPU 32 can (by addressing a block of 64 locations allocated to processor 22 in the memory space of processor 12) alert controller 52 that a data transfer command is on address bus 40. Line 24c acts as routing circuitry to connect the six least significant bits of the MPU address bus 40 (which can carry signals representing the data transfer commands) to instruction decode logic 90 in controller 52. There are four lines 24d. A READ/WRITE line carries a signal to controller 52 to indicate which way data is to be transferred through transceiver 80 (when a data transfer operation is ordered). A DTACK (data transfer acknowledge) line carries a signal from controller 52 to MPU 32 acknowledging that a transfer has been requested (thus enabling MPU 32 to adjust the timing of control signals to the MPU data bus, which operates asynchronously, so that data can be passed in synchronism with the operation of controller 52). A DONE line carries a signal from controller 52 to clock and interrupt generator 46 to cause it to interrupt MPU 32. An IACK (interrupt acknowledge) line carries a signal from MPU 32 to controller 52 acknowledging receipt of a signal on the DONE line. Controller 52 has internal register file 74, (which includes 32 general purpose registers each 16 bits long), an ALU 120, special purpose registers 122, an 8-deep program counter stack 102, interrupt logic 124, and program instruction decoder logic 90.

The registers in file 74 are used to supply indirect addresses to the memories (MI, ME, or MR).

Register file 74 is segmented into four pages (identified as 00, 01, 10, and 11), each containing eight registers. In each register, the 13 least significant bits represent data, e.g., an indirect address. The three most significant bits define if and how the value represented by the 13 least significant bits is to be updated each time that value is used as an indirect address, in accordance with the following table:

| Mode Bit | | | |
|---|---|---|---|
| 15 | 14 | 13 | Updating Mode |
| 1 | 1 | 1 | Increment or Decrement by 1 |
| 1 | 1 | 0 | Increment or Decrement by the value N1 |
| 1 | 0 | 1 | Increment or Decrement by the value N2 |
| 1 | 0 | 0 | Increment or Decrement with reverse carry |
| 0 | M | M | Increment or Decrement in |

| Mode Bit | | | |
|---|---|---|---|
| 15 | 14 | 13 | Updating Mode |
| | | | accordance with modulo register MM |

Some instructions in the instruction set for controller 52 may refer to any register in file 74; others may only refer to one of the eight registers in the so-called current page of file 74. When an instruction refers to a register for indirect addressing, the 13 least significant bits are unloaded onto address bus 62 and are also passed through ALU 120 and written back into the register after being updated in accordance with the three mode bits.

Instructions for controller 52 can be provided either from program memory 54 or from processor 12. The instruction from program memory 54 which originally referred to the register includes two bits to indicate whether to increment, decrement, or not change the register data value.

Special purpose registers 122 include two 2-bit page registers which determine which page in file 74 is the current page. One of the page registers holds a value (called PAGE) which determines the current page for finding indirect addresses called by SPC instructions from program memory 54. The other page register, called the host page register is accessible by MPU 32, and holds a value (PAGEH) which determines the page in file 74 to be accessed for instructions delivered from MPU 32.

Special purpose registers 122 also include two 13-bit offset registers for holding the values N1, and N2 for use in incrementing or decrementing a value in one of the registers in file 74 when the appropriate mode bits appear.

In addition, special purpose registers 122 include four modulus registers (M0, M1, M2, M3) each of which can hold a value less than or equal to 8191. When the mode bits of an accessed register indicate incrementing or decrementing by a modulus value, that value is found in the modulus register named by the second two mode bits. The effect of such mode bits is to cause the register data to be incremented by 1 modulo M where M-1 is the value stored in the specified modulus register. This permits creating circular buffers in memories MR, MI, or ME, the length of the buffer being specified by the value stored in the corresponding modulus register.

Finally, a reverse carry (RC) register is included in special purpose registers 122. When the mode bits specify an increment or decrement by reverse carry, the value stored in RC register is added to or subtracted from the lower 13 bits of the register, with arithmetic being performed with reverse carry, i.e., from left to right.

Instruction decoder logic 90 decodes each instruction appearing on instruction bus 58 and produces the microsignals needed to control the various parts of controller 52. There are three possible sources for the instruction on the instruction bus 58: program memory 54, address lines 24c together with READ/WRITE and IACK lines 24d, and data bus 64. Instructions received over address lines 24c and READ/WRITE and IACK lines 24d are mapped into instruction bits as follows:

| Source of Signal from Processor 12 or [Arbitrary Value] | Instruction Bit |
|---|---|
| HA1 | 0 |
| HA2 | 1 |
| HA3 | 2 |
| IACK | 3 |
| HA4 | 4 |
| [0] | 5 |
| HA5 | 6 |
| HA6 | 7 |
| [0] | 8 |
| [0] | 9 |
| READ/WRITE | 10 |
| [1] | 11 |
| [0] | 12 |
| [0] | 13 |
| [0] | 14 |
| [0] | 15 |

The eight indirect address registers in the page specified by the host page register may be accessed by MPU 32 (using the three least significant bits of the six address bits carried on line 24c) in order to effect direct transfers to MI, MR, or ME memory.

External memory 70 is organized to include three circular queues. Transmit task queue 92 holds the coordinates of the signal point to be next sent over channel 18. Receive output queue 94 holds the demodulated, equalized, and otherwise processed signal point most recently received over channel 18. Output queue 94 also holds status flags, e.g., carrier detect/loss, indicating how the signal receiving process is progressing. Receive task queue 96 holds a list of signal processing instructions (in the form of unique task numbers loaded in by MPU 32) to be performed by controller 52. Each task in task queue 96 corresponds to a set of instructions stored in program memory 54.

The input and output pointers, and depth counters necessary to define and maintain queues 92, 94, 96, are provided by controller 52, using facilities already available including the register file and modulus registers referred to above, thus permitting an extremely versatile interface to be established using a minimum of external circuitry.

Controller 52 also includes a halt flip-flop 100 which starts and stops the operation of controller 52.

Operation

To transmit data from data source 14 over channel 18, host processor 12 accepts the data stream through terminal interface 38, accumulates the data bits into symbols, maps the symbols into signal points and loads the signal points into transmit task queue 92 in external memory 70 of signal processor 22. Signal processor 22 converts the signal points into samples of the modulated carrier which it then delivers through external I/O devices 72 to channel 18.

When signals are received over channel 18, MPU 32 directs (by signal processing instructions loaded into receive task queue 96) signal processor 22 to perform filtering, equalization, demodulation, and decision-making functions. When finished, signal processor 22 stores each received signal point in receive output queue 94, where it is picked up by MPU 32. The received signal point is stored in the form of decision index pointing to a particular signal point in the available constellation of signal points. MPU 32 then decodes and descrambles the received signal point and delivers the resulting symbol to data sink 16.

During periods when host processor 32 is performing certain tasks (e.g., handling operator and terminal interaction) signal processor 22 can be independently performing a different task (e.g., filtering) assigned to it by host processor 12.

When processors 22, 32 are operating independently, MPU 32 performs its functions by generating an instruction address on MPU address bus 40, reading the instruction from ROM 34 over MPU data bus 39, decoding the instruction, and executing it by manipulating data stored in its internal registers or accessing data in RAM 36 or ROM 34 using address and data buses 40, 39.

Likewise, when not interacting with host processor 12, signal processing controller 52 decodes and executes instructions fetched from its associated program memory 54, in accordance with the task that it has been assigned to perform. In executing signal processing tasks, MAR-R 66 and MAR-I 68 can be commanded to perform arithmetic and logic functions or operations based on control signals sent from controller 52. The independent data paths and memories in each MAR enable up to two internal data transfers and MAR operations to be executed simultaneously based on the address generated by controller 52, an arrangement which provides a considerable speed enhancement for signal processing involving complex numbers.

In implementing signal processing functions, it is typically useful to configure memories MR, MI, or ME to behave like circular buffers, e.g., to behave like a delay line for equalization. This can be accomplished by indirectly addressing the locations in MR, MI, or ME using addresses supplied by controller 52 from one of the 32 registers in register file 74. While the MAR circuits 66, 68 are busy operating on the presently addressed piece of data, controller 52 updates (e.g., by incrementing or decrementing) the address to be used in the next operation, and stores it back in register file 74. Apart from the usual post-increment, post-decrement type of address arithmetic, controller 52 provides the capability to increment or decrement the address in a circular fashion (modulo M). This permits easy structuring of circular memory to emulate delay lines for modem filtering or equalization operations, or first-in-first-out queues. The value M-1 (where M is the length of the circular memory) is stored in one of the four separate modulo registers in controller 52.

Data may be directly transferred between an external device 72 and memory MR 76, MI 78, or ME 70 using one instruction, where the address of the external device is provided using part of the bits on SPE control bus 60 while the memory location is specified as usual via SPE address bus 62.

Processors 12, 22 must frequently transfer data back and forth, which requires distracting controller 52 from the program instructions it is performing. Thus it is desirable to make the execution of data transfer commands as rapid and simple as possible.

Data transfers are accomplished by data transfer commands sent from MPU 32 and directly executed (without referring to program memory 54) by processor 22. When MPU 32 intends to send a data transfer command, it delivers a CEN signal over line 24a. Receipt of the CEN signal causes controller 52 to pause at the end of the execution of the current program instruction. Controller 52 then holds the address of the next instruction temporarily in program counter 102. The CEN signal has the effect of enabling controller 52 to accept the 6 bits (HA6-HA1) on MPU address bus 40. The unique address combination indicated by HA6-HA1 is then converted by instruction decode logic 90 into a corresponding data transfer command, and immediately executed. When finished, controller 52 typically returns to the next instruction in the program it had been working on prior to the pause.

During execution of a data transfer command, the controller 52 generates control and address signals which are used by address decoder 63 to send signals both to the element (e.g., memory) which is to receive or send data from/to processor 12, and also to transceiver 80 to enable the transfer between the MPU data bus 39 and SPE data bus 64 and to indicate the direction of the transfer (derived from the READ/WRITE signal received over READ/WRITE line 24d).

A complete list of the data transfer commands which may be executed in this manner is:

| COMMAND DESIGNATION | DATA TRANSFER DESCRIPTION | |
|---|---|---|
| H0 | SPC internal control (normal mode) | |
| H1.0 | HOST to ME(INDIRECT) | (1) |
| H1.1 | ME(INDIRECT) to HOST | (1) |
| H1.2 | HOST to MR(INDIRECT) | (1) |
| H1.3 | MR(INDIRECT) to HOST | (1) |
| H1.4 | HOST to MI(INDIRECT) | (1) |
| H1.5 | MI(INDIRECT) to HOST | (1) |
| H2 | HOST to SPC register | (2) |
| H3 | SPC register to HOST | (2) |
| H4 | Read register in HOST Page and set (nonzero) SPC register | |
| H5.0 | READ PC (program counter) and clear HALT | |
| H5.1 | READ PC and set HALT | |
| H6 | Load PC (Host Jump) | |
| H7 | Read Program Memory at PC, Increment PC | |
| H8 | Single Step | |
| H9 | Read data from HOST and EXECUTE (Host Execute) | |
| H10 | Store interrupt priority in SPC register, IACK | |

Notes:
(1) Register may be modified as follows:
(a) no change.
(b) post-increment by 1 according to mode.
(2) Transfer all 16 bits to/from HOST.

The H0 command causes controller 52 to continue to operate in its normal mode, fetching and executing instructions from its program memory.

The group of commands H1.0 through H1.5, enable direct data transfers between the processor 12 and MAR or ME memories using a register in internal register file 74 for indirect addressing. When such commands are used, the three least significant bits of the MPU address bus 40 (HA3, HA2, HA1) specify one of eight registers in a page of eight registers in internal register file 74 (the page devoted to use by MPU 32 is determined by a value, called PAGEH, previously stored in the host page register). When a register in file 74 is used as an indirect address register, its least significant 13 bits may be subsequently incremented according to the mode bits of the register (i.e., the upper 3 bits). Bit HA4 determines whether the register is to be post-incremented or left unchanged. Note that there are a total of 48 possible indirect addressing data transfer instructions, because each of the six instructions H1.0 through H1.5 can address memory via any one of eight different registers in file 74.

The next two commands, H2 and H3, permit reading or writing one of eight registers in the current page of the register file 74, at a page number supplied by the PAGEH register which may be altered by the PAGEH SPE instruction. Note that reading or writing a register in register file 74 includes a transfer of the upper three mode bits, i.e., all 16 bits of the register are transferred to/from processor 12.

There are seven remaining commands, which can be used for diagnostics, synchronization, debugging, and monitoring of processor 22 by processor 12.

The Read register in Host Page And Set (nonzero) SPC register command (H4) places the contents of one of the first four registers in the page specified by PAGEH on SPE data bus 64 (for delivery to processor 12) and loads that register with all ones (13 bits). This test-and-set-type command permits synchronization of software tasks between processors 12, 22 and arbitration of resources shared between the two processors.

In the Read PC (program counter), and Clear Halt, and the Read PC, and Set Halt commands (H5.0, H5.1), controller 52 provides the value in the controller's program counter 102 to MPU 32 on the 13 least significant bits of MPU data bus 39. The upper three bits are read as 1. MPU 32 may set or clear HALT flip-flop 100 with these commands according to the value of the least significant bit (HA1). If Halt 100 was clear, setting Halt will stop controller 52 and clearing it will have no effect. If Halt 100 was set, setting it will have no effect and clearing it will restart controller 52. Controller 52 should typically be restarted (Halt cleared) only after program counter 102 has been restored to the controller 52 from MPU 32 via the Host Jump instruction (see below).

The Load PC (Host Jump) command (H6) causes program counter 102 to be loaded with data supplied by processor 12. This instruction can be used only while Halt is set.

In executing the Read Program Memory at PC, Increment PC command (H7), the program memory 54 is read by MPU 32 at the location pointed to by program counter 102, which is then post-incremented. This command is used only if controller 52 is halted and interrupts are disabled.

The Single Step command (H8) is used only in the Halt mode. The command removes the Halt and typically executes one instruction. After completion, controller 52 returns to its previous state which should be a Halt.

The Read Data from Host and Execute (Host Execute) command (H9) instructs controller 52 to take the data supplied by MPU 32 on SPE data bus 64 and execute it as an instruction.

The Valid IACK command (H10) is executed during a Host Interrupt sequence (i.e., when controller 52 interrupts processor 12). The three least significant bits (HA3-HA1) are continuously compared to a priority register in controller 52. The priority register contains three interrupt priority bits and can be set by the PRTY SPE instruction. If the compare is true and the IACK and DONE signals are asserted, a valid IACK occurs. The command then causes an interrupt vector, stored in page zero of file 74, to be read by MPU 32 to begin interrupt processing.

The set of host commands have been selected to permit an efficient and flexible software interface between processors 12, 22, without requiring an external FIFO or dual-port memory device.

In operation, clock and interrupt circuitry 46 interrupts MPU 32 at the transmit and receive symbol (or baud) clock rates. When interrupted by the transmit clock, MPU 32 collects data from source 14 and translates it into signal point coordinates to be sent. MPU 32 then loads these coordinates into transmit task queue 92 by commanding a data transfer using the appropriate data transfer command. When interrupted by the receive clock, MPU 32 first collects the results of the previous symbol's receive task from receive output queue 94. Based on the status flags, e.g., carrier detect/loss, also collected from output queue 94, MPU 32 updates its receiver state and assigns a new receive task to controller 52 by storing a unique task number in receive task queue 96. The MPU 32 also decodes, descrambles, and delivers the previous symbol's data to data sink 16. The receive symbol interrupt has higher priority than the transmit interrupt in MPU 32.

After completing its previous task, controller 52 examines the receive and transmit task queues 92, 96, in that order, to determine whether one or the other task is awaiting execution. The receive task is thus given higher priority. During execution of the receive task, controller 32 unloads the task number from receive task queue 96, operates (using instructions in its program memory 54) on received signal samples according to the assigned task, generates status flags and data for MPU 32, and stores them in the output queue 94. Upon executing a transmit task, controller 52 unloads the signal point coordinates from transmit task queue 92 and generates samples of the transmit waveform to be transmitted over channel 18.

Using the appropriate commands, MPU 32 may also read/write other data memory locations at sporadic intervals for maintenance, diagnostics or monitoring.

Other embodiments are within the following claims.

We claim:

1. Apparatus for effecting a transfer of data between a first processor and a second processor in accordance with data transfer commands sent from said first processor to said second processor, said processors each having a program instruction memory, said processors operating independently and simultaneously when no data transfer is occurring between said processors, said apparatus comprising:

data transfer circuitry connected between said processors for transferring said data;

a program instruction decoder operably coupled by routing circuitry to said first processor and operably coupled to the program instruction memory of said second processor, said first processor sending said data transfer commands to said program instruction decoder which decodes said data transfer commands and sends signals to said data transfer circuitry to effect the transfer of data between said processors;

said second processor executing instructions stored in the program instruction memory of said second processor by decoding said instructions by said program instruction decoder when no data transfer is occurring between said processors; and interface circuitry, coupled to one of said processors, for delivering to an information-carrying channel a carrier signal modulated by said one processor in accordance with said data transferred between said processors, said interface circuitry also for accepting a modulated carrier signal of data for processing by one of said processors.

2. The apparatus of claim 1 wherein said second processor uses at least its program instruction memory and said program instruction decoder to perform signal processing tasks on said accepted carrier signal.

3. Apparatus for effecting a transfer of data between a first processor and a second processor in accordance with a data transfer command sent from said first processor to said second processor, said processors each having a program instruction memory, said processors operating independently and simultaneously when no data transfer is occurring between said processors, said apparatus comprising:

data transfer circuitry connected between said processors for transferring said data;

a program instruction decoder operably coupled by routing circuitry to said first processor and coupled to the program instruction memory of said second processor, said first processor sending said data transfer command to said program instruction decoder, said second processor utilizing said program instruction decoder for performing said data transfer command by decoding said data transfer command and sending signals to said data transfer circuitry to effect the transfer of data between said processors;

said second processor executing instructions stored in the program instruction memory of said second processor when no data transfer is occurring between said processors, said first processor performing a task command when no data transfer is occurring between said processors by decoding and executing instructions stored in the program instruction memory of said first processor;

said first processor further comprising an address bus for carrying addresses of the instructions in the program instruction memory of said first processor; and said routing circuitry comprising at least a portion of said address bus for carrying said data transfer command to said program instruction decoder.

4. Apparatus for effecting a transfer of data between a first processor and a second processor in accordance with a data transfer command sent from said first processor to said second processor, said processors each having a program instruction memory, said processors operating independently and simultaneously when no data transfer is occurring between said processors, said apparatus comprising:

data transfer circuitry connected between said processors for transferring said data;

a program instruction decoder operably coupled by routing circuitry to said first processor and coupled to the program instruction memory of said second processor, said first processor sending said data transfer command to said program instruction decoder, said second processor utilizing said program instruction decoder for performing said data transfer command by decoding said data transfer command and sending signals to said data transfer circuitry to effect the transfer of data between said processors;

said first processor performing a first task command when no data transfer is occurring between said processors by decoding and executing instructions stored in the program instruction memory of said first processor, said second processor performing a second task command by executing instructions stored in the program instruction memory of said second processor when no data transfer is occurring between said processors;

a memory in said second processor for storing at successive addresses each of a number (M) of related pieces of said data upon which said second processor is to perform said second task command;

an indirect address register, operably coupled to said memory, for holding a value corresponding to the address of a next one of said related pieces of data upon which said second task command is to be performed; and updating circuitry, operably coupled to at least said indirect address register, for incrementing, in circular buffer fashion, said value once after each performance of said second task command until said incrementing has occurred M-1 times, and thereafter returning the value to the first address of said successive addresses.

* * * * *